United States Patent [19]

Knize et al.

[11] Patent Number: 5,124,952
[45] Date of Patent: Jun. 23, 1992

[54] FORMATION FRACTURE DETECTION USING INSTANTANEOUS CHARACTERISTICS OF SONIC WAVEFORMS

[75] Inventors: Stanislav Knize; John W. Minear, both of Houston, Tex.

[73] Assignee: Halliburton Logging Services, Inc., Houston, Tex.

[21] Appl. No.: 353,310

[22] Filed: May 17, 1989

[51] Int. Cl.[5] .............................................. G01V 1/40
[52] U.S. Cl. ........................................................ 367/34
[58] Field of Search .................... 367/27, 28, 33, 34, 367/35, 38, 25, 55, 30, 59, 73

[56] References Cited

U.S. PATENT DOCUMENTS

| | | | |
|---|---|---|---|
| 3,500,543 | 3/1970 | Quarles, Jr. | 33/1 C |
| 4,210,966 | 7/1980 | Ingram | 367/27 |
| 4,279,026 | 7/1981 | Lambright et al. | 367/70 |
| 4,672,588 | 6/1987 | Willen | 367/28 |

FOREIGN PATENT DOCUMENTS 2029016  3/1980  United Kingdom .................. 367/57

*Primary Examiner*—Ian J. Lobo
*Attorney, Agent, or Firm*—William J. Beard

[57] ABSTRACT

A method for enhancing a plurality of recorded waveforms from sonic logging is disclosed. As a function of depth along a well borehole, a plurality of sonic waveforms is obtained. Adjacent waveforms are registered by time shifting so that common event coincides between adjacent waveforms. Typically this is the arrival of the P, S or $S_t$ wave component. Then, adjacent waveforms are subtracted from one another to provide a difference waveform, and the difference waveforms are then presented. This enhances oblique occurring events. Further, instantaneous waveform characteristics for each of the recorded waveforms are presented to further assist in data interpretation to locate and identify oblique occurring events.

24 Claims, 5 Drawing Sheets

FIG.1
FIG.2
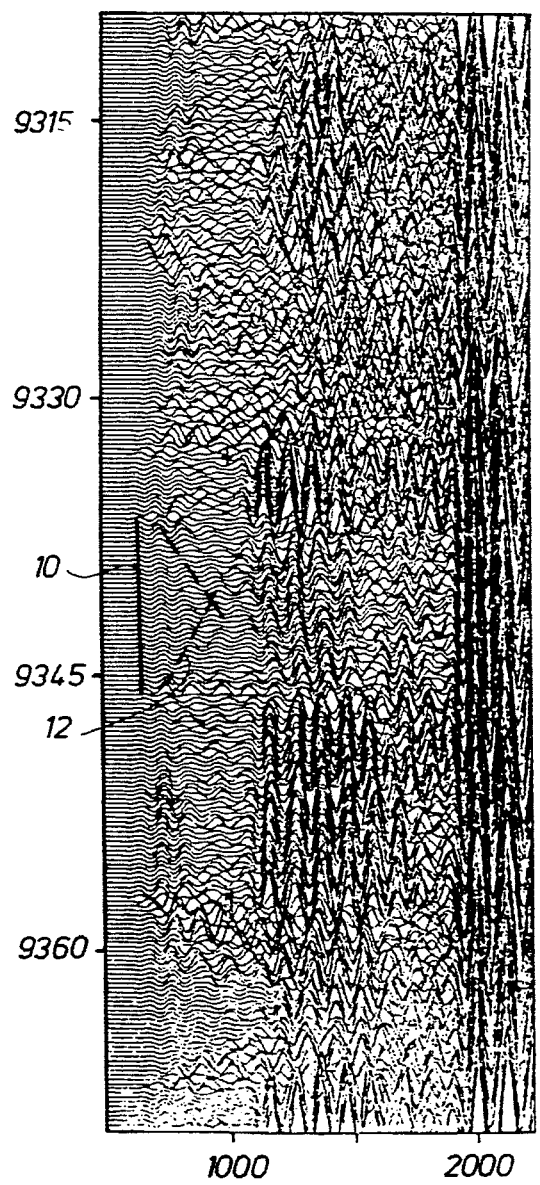
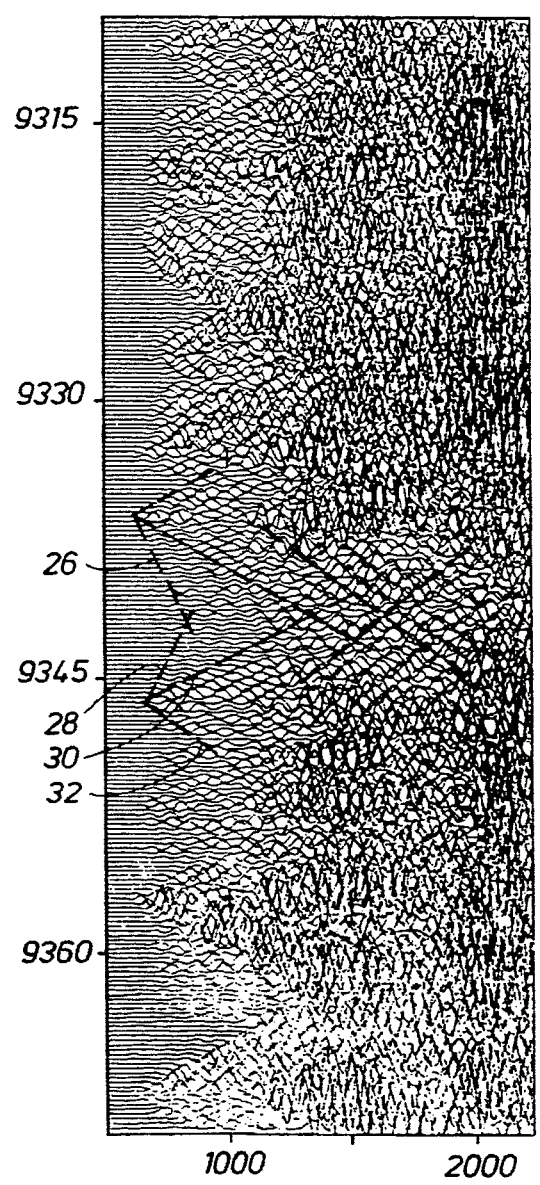

FORMATION FRACTURE DETECTION USING INSTANTANEOUS CHARACTERISTICS OF SONIC WAVEFORMS

BACKGROUND OF THE DISCLOSURE

The present disclosure is directed to a method of analysis of waveforms obtained in acoustic logging to extract information about the formation which is not obtained in standard presentation of the waveform. One purpose is to obtain formation fracture information. It is intended to be used in data processing and analysis of sonic waveforms obtained from the use of a full waveform acoustic logging device. The acoustic logging device incorporates one or more transmitters which sends an acoustic wave into the adjacent formations, and which also includes one or more receivers which provide a recording of the received signal back from the formation. The acoustic waveform presentation typically includes a complex waveform, which when inspected, normally provides graphic evidence of the compressional component of the waveform, the subsequently occurring shear component of the waveform and the last component which arrives, namely, the Stoneley component. These are sometimes symbolically represented as the P, S and $S_t$ components. The acoustic signals from a particular receiver are recorded as a function of depth in the well borehole, and are presented by recording for a time interval sufficient to record all phases described above. The data is normally presented with a horizontal scale measured in microseconds, typically extending out to about 4,000 microseconds. The recorded waveform signals are typically presented on strip chart paper, film or the like and provides a graphic representation which includes refracted waves. Sometimes, reflected events called oblique events can be recognized in the recorded data. The data is analyzed with well known procedures to obtain an interpretation. In the event oblique events cannot be sufficiently recognized and evaluated, the present procedure enhances the presentation of the recorded data so that oblique events can be recognized and evaluated.

The improved data processing and interpretation approach taught by the present disclosure is particularly useful in locating oblique events and especially oblique fractures. One ordinarily envisions the formations encountered by a well borehole as a stack of horizontal layers which layers may have different sonic transmission characteristics and which have interfaces between layers. Such a representation may well prevail as the norm, but geological events cause variations from the horizontal layer model. Assume for purposes of example that the particular region which is being drilled previously experienced stress from an upthrust or other geological event. Such events will typically create fractures in the various formations. Knowledge of the location of such fractures including their angle is extremely helpful to determining information about the formation; it is also helpful to measure the location and dip angle of such fractures. In conjunction with other data, the data provided by the present disclosure is useful in interpretation of a sonic log and in therefore useful to provide further information after log interpretation. In fact, the information provided is enhanced so that fractures which would otherwise be obscure and missed can then be located.

The analysis and procedure set forth in the present disclosure involves the recording and presentation of sonic waveforms from a sonic logging operation conducted in a conventional fashion. Such data is captured and presented in the ordinary strip chart. That might provide a first valuable insight into the formations. However, the present procedure contemplates further processing. After adjacent recorded waveforms are recorded, analysis is first conducted to locate the precise time of arrival of the compression wave. Time shifting of one waveform compared to the next is done so that the P wavefront arrival in both waves is shifted to a common time for the two waveforms, and the difference between the two adjacent waveforms in then recorded. In other words, the two adjacent waveforms are presented in a stacked fashion. This involves alignment of the P event, or the later arriving S events. Alternately, the Stoneley event can likewise be stacked, and the difference between adjacent waveforms then presented. The presentation of the time shifted and subtracted waveforms provides a completely new set of waveforms. This set suppresses refracted and guided modes and enhances the obliquely arriving wavefront. For this set of waveforms, time dependent characteristics are measured. Such measurements include the relative phase and the first derivative of the phase measurement which is signal frequency. The waveform magnitude is represented, preferably in the form of a normalized value dependent on the vector amplitude. This is the modulus of the envelope of the complex waveform. The stacked depth dependent waveforms are enhanced in these three characteristics, and when the three characteristics are represented utilizing known color coding display procedures and in conjunction with the time shifted and stacked presentation of traces, obliquely arriving reflective modes are presented in a more clear and identifiable fashion. One purpose of the present procedure is to process acoustic waveform data in a new and different fashion to enhance the oblique events caused by fractures and to suppress the regular refracted and guided waves. This processing procedure can be applied to data obtained from practically all types of formations, and is thus available for use with conventional traces obtained heretofore. In fact, it can be used with an old recording of waveforms. That is, newly obtained data as well as old data can be handled and presented in a fashion which enables oblique event identification.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a set of recorded waveforms from a sonic logging tool recorded as a function of time where the horizontal measure is microseconds delay after acoustic wave transmission and the ordinate shows the waveforms obtained at different depths;

FIG. 2 shows the waveforms of FIG. 1 after processing to suppress the regular refracted waves which enhances presentation of the oblique events, when the oblique events are identified at the dotted lines;

FIGS. 4 and 5 each represent instantaneous waveform characteristics of the data shown in FIG. 1 wherein FIG. 4 shows the oblique events enhanced, and FIG. 5 represents the same data without the enhancement of the present disclosure, and the characteristics are modulus, phase angle, and frequency.

DETAILED DESCRIPTION OF THE PREFERRED EMBODIMENT

The present disclosure is directed to a method of processing recorded waveforms and more particularly sonic waveforms obtained from acoustic logging tool of typical construction. The acoustic logging tool provides data which is normally recorded and presented in the fashion shown in FIG. 1 of the drawings. Referring to FIG. 1 of the drawings, the recorded waveforms on the depth related graph encompass the range of about 9310 to about 9380 feet in a well. The individual traces are obtained from a single receiver on the acoustic logging sonde. The several traces are obtained at regular vertical depths, typically being spaced at a predetermined spacing such as one quarter, one half or one foot along the well. The dimensions of FIG. 1 are time delay in recording of the signal so that the maximum horizontal dimension is typically up to about 4000 microseconds. Each trace encodes the amplitude of the received signal and thus deflection is proportionate to amplitude.

The numeral 10 identifies a regular refracted wave where the onset of the P wavefront in the several adjacent traces is aligned with the straight line 10. This is contrasted with reflected waves from fractures and the like which are at oblique angles and which create the multiple trace pattern by the dotted line at 12 in FIG. 1.

Figure 3:
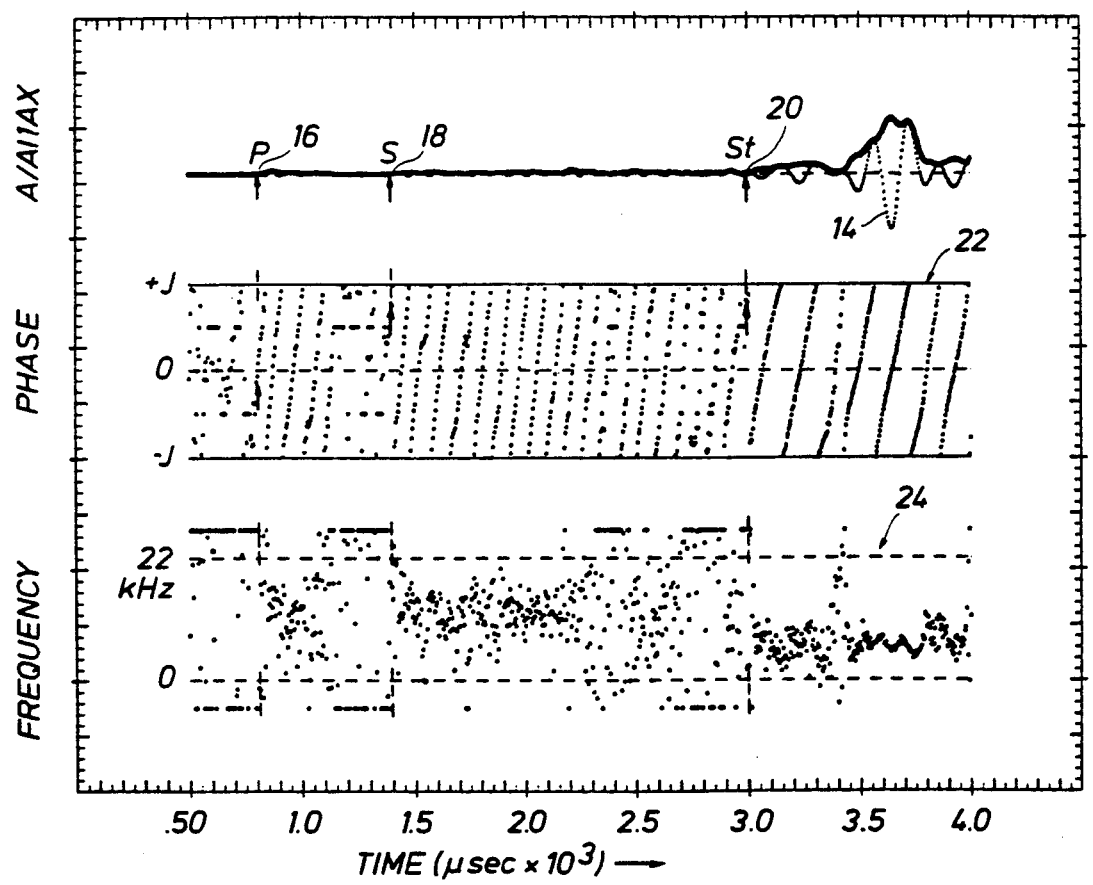
FIG. 3 shows the instantaneous waveforms characteristics of a single waveform of the type found in FIG. 1 showing the waveform including arrival of the compression wave, the shear wave and the Stoneley wave component.

The contrast of FIGS. 1 and 2 is helpful to show the benefit of the processing technique with the present procedure. A single waveform of a representative nature is shown in FIG. 3 of the drawings. There, the waveform trace 14 represents the normalized amplitude. The trace 14 is the amplitude divided by the maximum amplitude, $A_{max}$. This enables the relative size of the P, S and $S_t$ waves to be observed. The onset of the P wave in the trace 14 is shown at 16, and the S onset is indicated at 18. In similar fashion, the $S_t$ onset is shown at 20. Each data point which makes up the wave 14 is additionally analyzed for three characteristics. Thus, the envelope of the uppermost trace in FIG. 3 represents the waveform modulus while the central data pattern is the phase shift. There, phase shift for one revolution is represented by $2\pi$ so that the abscissa is referenced at zero and phase shift is shown with plus $\pi$ above and minus $\pi$ below. It will be observed that each of the data points has a particular phase shift and that is calculated by procedures well known for each data point in the trace.

In addition to plotting the waveform modulus and instantaneous phase shift, FIG. 3 also shows that the instantaneous frequency of the signal is examined for frequency and the frequency data point is plotted in the third trace. The phase shift data is generally indicated at 22 while the frequency data is indicated at 24. These three characteristics (instantaneous values) of the single waveform are used in a fashion to be described below to aid and assist interpretation of the data.

Returning now to FIG. 2, FIG. 2 is obtained by treatment of adjacent traces recorded in FIG. 1 in the following fashion. Assume that a first trace is made and is represented by the symbol $T_1$, and the adjacent trace is represented by the symbol $T_2$, and traces are recorded until $T_n$ is obtained. In both $T_1$ and $T_2$ there are specific events, one of which is the arrival of the P wave. An alternate common event between the traces $T_1$ and $T_2$ is the arrival of the shear wavefront or the S event as exemplified in FIG. 3. For that matter, the $S_t$ event can also be selected. In all cases, adjacent time traces $T_1$, $T_2$, $T_3$ . . . are each individually shifted with respect to the other so that they register on a common arrival time of a specified phase event in the several similar waves. This requires time shifting of each one relative to the other. Thus, the traces $T_1$, $T_2$, $T_3$ . . . are aligned to show the common arrival time. This modifies the several traces so that they will then be represented by the symbol $S_1$, $S_2$, . . . $S_n$. This refers to those traces which have been time shifted to a common reference event for a set (not necessarily all traces $T_n$ but at least a set of adjacent traces) and they are aligned for subsequent processing. The next step after alignment is then to obtain a difference by substraction of adjacent traces. Accordingly, the next step is to substract $S_2$ from $S_1$. This yield the resultant or difference wave which will be represented as $S_1 - S_2 = R_1$, and the next subtraction is $S_2 - S_3 = R_2$. This is extended out so that one obtains a sequence of $R_1$, $R_2$ . . . $R_{n-1}$. FIG. 2 shows the recorded traces after time registration, and subtraction, or shows a set of waveforms $R_1$, $R_2$ . . . through the last trace. These processed waveforms suppress regular refracted constituents but enhance the oblique events. Accordingly, there are oblique events in the same region as marked in FIG. 1 but they are now enhanced in presentation. For example, events at the dotted lines at 26, 28, 30 and 32 are more easily observed in this presentation. The obscuring and overwhelming nature of the regular refracted wave constituents is thereby reduced. Accordingly, the contrast shown in FIG. 2 provides greater emphasis to the oblique events. Now, potentially important oblique events shown at 26, 28, 30 and 32 can be more readily analyzed.

Figure 4:
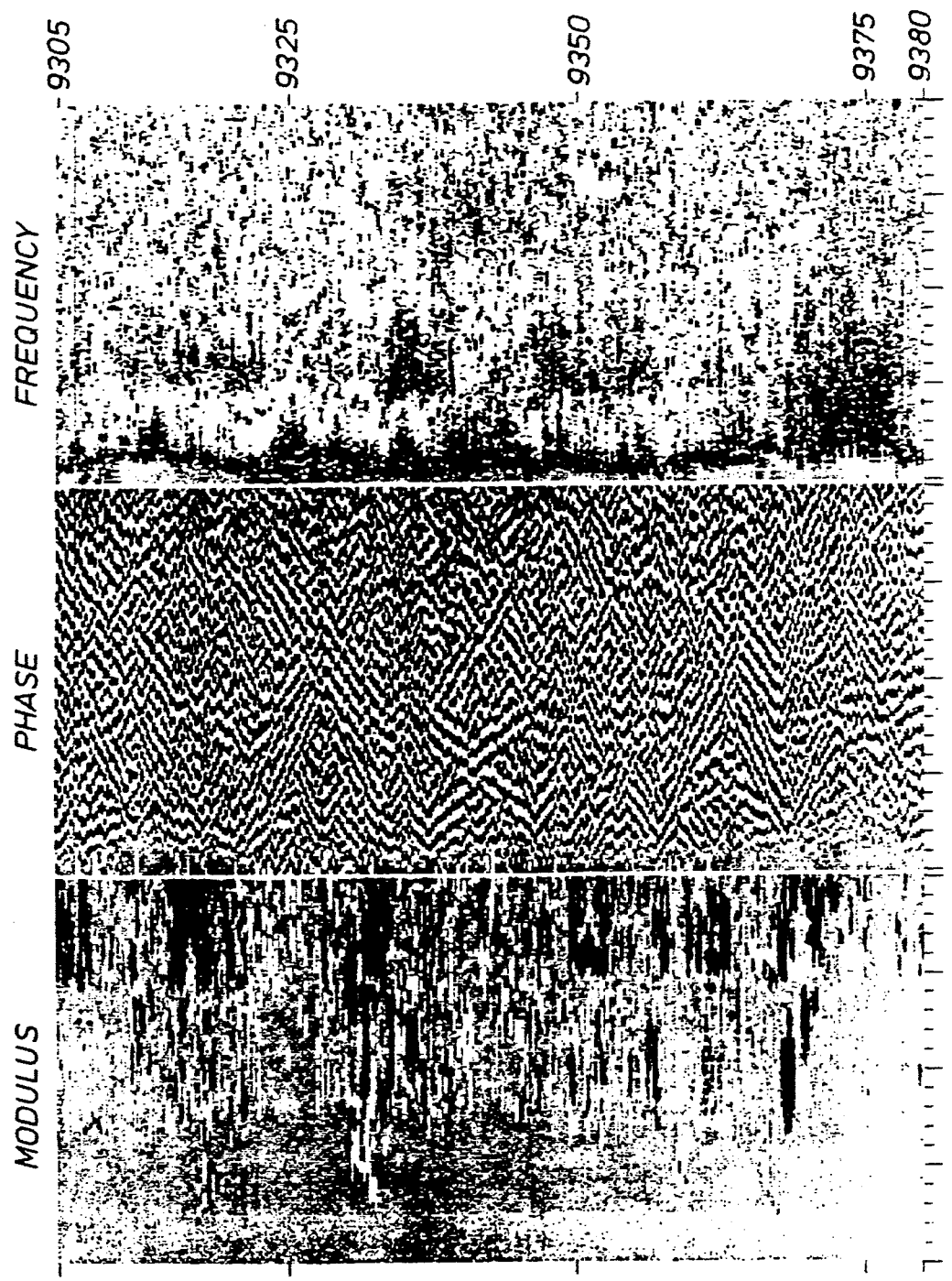
Figure 5:
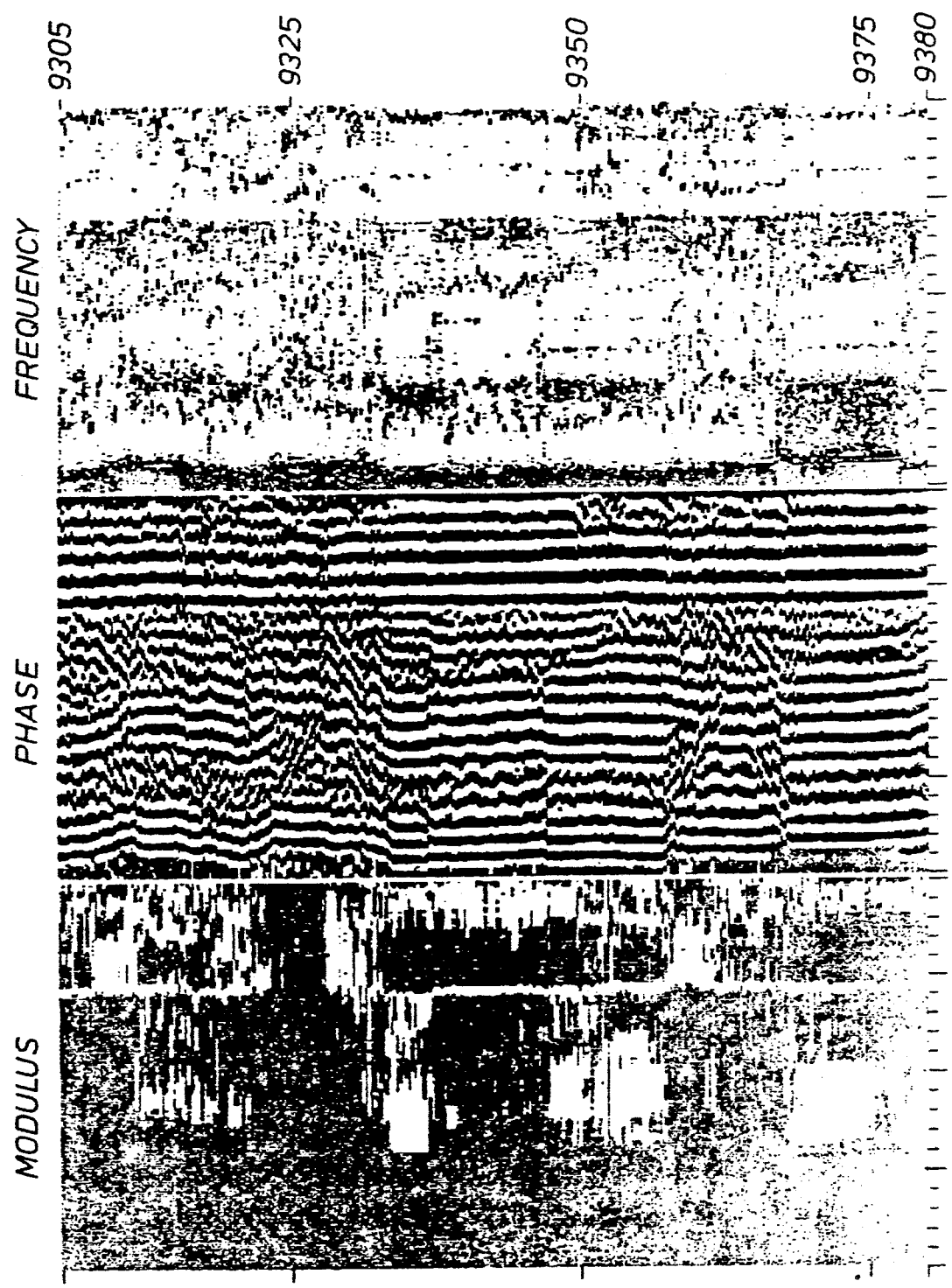

The three characteristics for a single waveform in FIG. 3 are extracted from the shifted and substracted traces. FIG. 4 shows the three instantaneous characteristics, a set or sequence of traces modified in accordance with this disclosure. In the left hand representation, the waveform modulus is shown. For convenience, it is represented as a relative value and is therefore plotted on an abscissa as dB. The central characteristic is the phase which is plotted for the span of plus $\pi$ to minus $\pi$. The frequency is plotted from some selected low frequency (say under 1,000 hertz) to the maximum which is about 22,000 hertz. FIG. 4 is thus the characteristic representation for the data shown in FIG. 2, meaning the entire set of traces shown in FIG. 2. By contrast, FIG. 5 represents the same three waveform characteristics for data from FIG. 1, i.e., without enhancing the oblique events in accordance with the procedure set forth.

Figure 6:
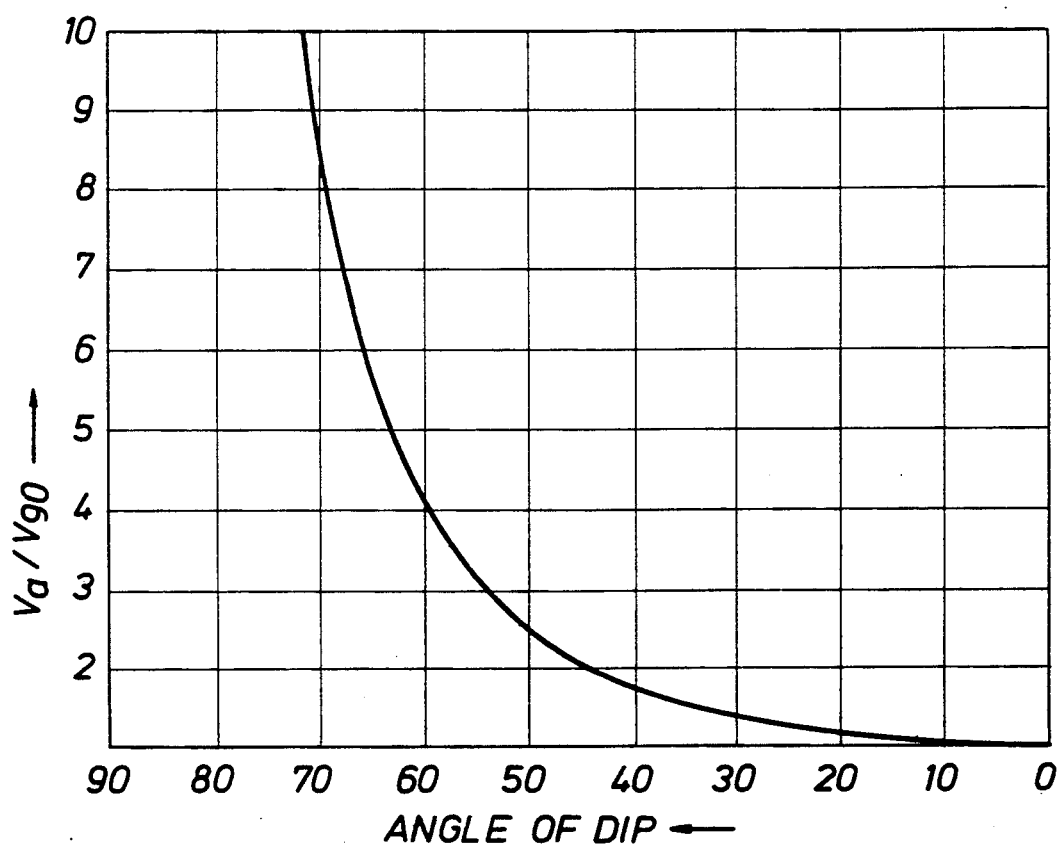
FIG. 6 is a graph of the apparent velocity normalized to apparent velocity in a horizontal plane with respect to the dip angle of the event of interest.

There is a trigonometric distortion which particularly relates to fractures having a dip angle of about 70° or greater. Oblique events in this general category will shown an apparent velocity which is extremely large. It may well provide a near vertical appearance which is more readily lost in the presence of the regular refracted events as is exemplified in FIG. 1. By evaluating the traces to provide the three characteristics in the fashion analyzed in FIG. 3, assistance can be obtained in interpreting such high angle oblique events. FIG. 6 of the drawings shows the impact of the event dip angle. The ordinate is a ratio of apparent velocity normalized by velocity in a horizontal bed. This shows clearly how the increased dip angle of the fracture or other event severely distorts the velocity data. Such a distortion is more easily observed in providing the three characteristics of the data as represented in FIG. 4 of the drawings.

Acoustic log analysis is thus enhanced by the presentation of the data in the fashion shown herein and in particular with representations of FIGS. 2 and 4. Particularly where the data processing equipment utilizes color enhancement, oblique events can be detected more readily.

While the foregoing is directed to the preferred disclosure, the scope of the present disclosure is determined by the claims which follow:

What is claimed is:

1. A method of enhancing presentation of multiple logging traces from acoustic radiation wherein the method comprises:
    (a) at selected and spaced depths along a well borehole, transmitting and receiving an acoustic pulse from a sonde repetitively to form a plurality of acoustic traces wherein adjacent traces are obtained at different depths in the well borehole and each trace represents the acoustic pulse response;
    (b) aligning a sufficient number of adjacent traces to a common P event in the traces to obtain common registration between the traces so that the trace provide a modified representation:
    (c) subtracting adjacent traces after alignment to obtain a difference trace; and
    (d) recording on a medium the difference traces as a function of time in the well borehole wherein the recordings provide a presentation enhancing oblique occurring events.

2. The method of claim 1 wherein the step of recording utilizes color coding to enhance the recorded presentation.

3. The method of claim 1 wherein adjacent traces are recorded for a specified time interval dependent on the extent of investigation from the well borehole.

4. The method of claim 1 wherein instantaneous waveform characteristics at a selected set of points along each individual waveform are separately provided for frequency, phase and waveform modules.

5. The method of claim 4 wherein instantaneous data is recorded for a time of about 4000 microseconds.

6. The method of claim 1 including the step of obtaining traces at evenly spaced depths along the well borehole.

7. The method of claim 1 including the step of obtaining traces by an acoustic receiver directed in a common azimuth.

8. The method of claim 1 including the step of forming a first record of traces, and a second record of traces by the method of claim 1 to enable a contrast between the first and second records.

9. A method of enhancing presentation of multiple logging traces from acoustic radiation wherein the method comprises:
    (a) at selected and spaced depths along well borehole; transmitting and receiving an acoustic pulse from a sonde repetitively to form a plurality of acoustic traces wherein adjacent traces are obtained at different depths in the well borehole and each trace represents the acoustic pulse response;
    (b) aligning a sufficient number of adjacent traces to a common S event in the traces to obtain common registration between the traces so that the trace provide a modified representation:
    (c) substracting adjacent traces after alignment to obtain a difference trace; and
    (d) recording on a medium the difference traces as a function of time in the well borehole wherein the recordings provide a presentation enhancing oblique occurring events.

10. The method of claim 9 wherein the step of recording utilizes color coding to enhance the recorded presentation.

11. The method of claim 9 wherein adjacent traces are recorded for a specified time interval dependent on the extent of investigation from the well borehole.

12. The method of claim 9 wherein instantaneous waveform characteristics at a selected set of points along each individual waveform are separately provided for frequency, phase and waveform modules.

13. The method of claim 12 wherein instantaneous data is recorded for a time of about 4000 microseconds.

14. The method of claim 9 including the step of obtaining traces at evenly spaced depths along the well borehole.

15. The method of claim 9 including the step of obtaining traces by an acoustic receiver directed in a common azimuth.

16. The method of claim 9 including the step of forming a first record of traces, and a second record of traces by the method of claim 9 to enable a contrast between the first and second records.

17. A method of enhancing presentation of multiple logging traces from acoustic radiation wherein the method comprises:
    (a) at selected and spaced depths along well borehole; transmitting and receiving an acoustic pulse from a sonde repetitively to form a plurality of acoustic traces wherein adjacent traces are obtained at different depths in the well borehole and each trace represents the acoustic pulse response;
    (b) aligning a sufficient number of adjacent traces to a common $S_t$ event in the traces to obtain common registration between the traces so that the trace provide a modified representation:
    (c) substracting adjacent traces after alignment to obtain a difference trace; and
    (d) recording on a medium the difference traces as a function of time in the well borehole wherein the recordings provide a presentation enhancing oblique occurring events.

18. The method of claim 17 wherein the step of recording utilizes color coding to enhance the recorded presentation.

19. The method of claim 17 wherein adjacent traces are recorded for a specified time interval dependent on the extent of investigation from the well borehole.

20. The method of claim 17 wherein instantaneous waveform characteristics at a selected set of points along each individual waveform are separately provided for frequency, phase and waveform modules.

21. The method of claim 20 wherein instantaneous data is recorded for a time of about 4000 microseconds.

22. The method of claim 17 including the step of obtaining traces at evenly spaced depths along the well borehole.

23. The method of claim 17 including the step of obtaining traces by an acoustic receiver directed in a common azimuth.

24. The method of claim 17 including the step of forming a first record of traces, and a second record of traces by the method of claim 17 to enable a contrast between the first and second records.

* * * * *